(12) United States Patent
Collier

(10) Patent No.: US 11,466,374 B1
(45) Date of Patent: *Oct. 11, 2022

(54) CO2 CAPTURE AND SEQUESTRATION SYSTEM UTILIZING HIGH DENSITY GEOMETRIC CONSTRUCTS

(71) Applicant: Terence Collier, Rowlett, TX (US)

(72) Inventor: Terence Collier, Rowlett, TX (US)

(*) Notice: Subject to any disclaimer, the term of this patent is extended or adjusted under 35 U.S.C. 154(b) by 29 days.

This patent is subject to a terminal disclaimer.

(21) Appl. No.: 17/123,416

(22) Filed: Dec. 16, 2020

Related U.S. Application Data

(63) Continuation-in-part of application No. 16/276,982, filed on Feb. 15, 2019.

(60) Provisional application No. 62/974,729, filed on Dec. 18, 2019, provisional application No. 62/695,230,
(Continued)

(51) Int. Cl.
| | |
|---|---|
| *C25B 9/00* | (2021.01) |
| *C25B 11/03* | (2021.01) |
| *B01J 35/04* | (2006.01) |
| *B01D 53/22* | (2006.01) |
| *B01D 71/02* | (2006.01) |
| *B01D 53/14* | (2006.01) |
| *C25B 1/23* | (2021.01) |
| *C25B 1/04* | (2021.01) |
| *C25B 9/17* | (2021.01) |
| *C25B 11/075* | (2021.01) |
| *C25B 11/077* | (2021.01) |
| *B01D 57/02* | (2006.01) |

(Continued)

(52) U.S. Cl.
CPC .......... *C25B 11/03* (2013.01); *B01D 53/1418* (2013.01); *B01D 53/1425* (2013.01); *B01D 53/1475* (2013.01); *B01D 53/228* (2013.01); *B01D 53/229* (2013.01); *B01D 57/02* (2013.01); *B01D 71/022* (2013.01); *B01J 23/14* (2013.01); *B01J 23/72* (2013.01); *B01J 35/04* (2013.01); *C25B 1/04* (2013.01); *C25B 1/23* (2021.01); *C25B 9/17* (2021.01); *C25B 11/075* (2021.01); *C25B 11/077* (2021.01)

(58) Field of Classification Search
CPC .. C25B 9/17; C25B 9/00; C25B 11/04; C25B 11/031; C25B 11/00; C25B 11/02; C25B 11/03; C25B 11/061; C25B 11/077
See application file for complete search history.

(56) References Cited

U.S. PATENT DOCUMENTS

| | | | | |
|---|---|---|---|---|
| 2002/0039847 | A1* | 4/2002 | Clayton | ............... G01R 1/0466 439/65 |
| 2014/0332401 | A1* | 11/2014 | Gilliam | ..................... C25B 9/00 205/555 |
| 2017/0073825 | A1* | 3/2017 | Sugano | ................. C25B 11/031 |

* cited by examiner

*Primary Examiner* — Zulmariam Mendez
(74) *Attorney, Agent, or Firm* — Michael Diaz

(57) ABSTRACT

A catalytic system for $CO_2$ capture and sequestration. The system includes a reduction cell for separating a carrier medium having an anode generating oxygen, a cathode generating hydrogen, and a CO precursor from the carrier medium. In addition, the system includes a power supply for providing electrical power to the anode and the cathode. An electrolysis process occurs where oxygen, hydrogen, CO precursors are produced. The anode and the cathode include a plurality of geometrical constructs to increase an active surface area of a catalytic surface of the anode and cathode to increase an efficiency of the electrolysis process. The geometrical constructs may include vias and pillars. In one embodiment, a capillary action is produced for $CO_2$ sequestration across the catalytic surface having a plurality of vias.

23 Claims, 8 Drawing Sheets

Related U.S. Application Data filed on Jul. 9, 2018, provisional application No. 62/695,289, filed on Jul. 9, 2018.

(51) Int. Cl.
*B01J 23/72* (2006.01)
*B01J 23/14* (2006.01)

CO2 CAPTURE AND SEQUESTRATION SYSTEM UTILIZING HIGH DENSITY GEOMETRIC CONSTRUCTS

RELATED APPLICATIONS

This utility application is a continuation-in-part application of co-pending U.S. patent application Ser. No. 16/276,982 filed Feb. 15, 2019 which claims the benefit of U.S. Provisional Patent Application Ser. No. 62/695,230 filed Jul. 9, 2018 by Terence Collier and U.S. Provisional Patent Application Ser. No. 62/695,289 filed Jul. 9, 2018 by Terence Collier which are all hereby incorporated by reference. In addition, this utility application claims the benefit of U.S. Provisional Patent Application Ser. No. 62/974,729 filed Dec. 18, 2019 by Terence Collier and also is hereby incorporated by reference.

BACKGROUND OF THE INVENTION

Field of the Invention

The invention relates to $CO_2$ capturing and repurposing. Specifically, and not by way of limitation, the present invention relates to a system utilizing high density constructs.

Description of the Related Art

The constantly increasing $CO_2$ levels have been correlated to increasing global temperatures, rising sea levels, local environmental and ecological concerns at a cost that could approach trillions of dollars to mitigate the impact of increasing $CO_2$ levels. It would be advantageous to have a solution to capture and reduce $CO_2$ levels both in terms of the environment as well as the global economy. By utilizing the seemingly unlimited resource of terrestrial, air and aquatic $CO_2$, it is also possible to generate fuels and raw materials for complex compounds, both organic and inorganic, at a substantially reduced rate, thereby minimizing the need for consumption of non-renewable petroleum reserves. It would be advantageous to have a system for not only reducing $CO_2$ emissions by capture but the conversion of the $CO_2$ into viable materials.

Catalysts are effective tools for conversion and repurposing materials. The catalysts can be powders, solutions, membranes, or plates. Typically plates (electrodes) are metal (or other materials) with a target composition set to optimize the generation (preference) of the formation of a targeted by-product. In addition, the plates may also have features or additional materials added to improve the plate's surface area and reactivity. It would be advantageous to have a system where $CO_2$ locked into a solvent-based (i.e., liquid, gas, or solid form) media, can be captured, sequestered or "repurposed" to usable materials (rather than recycled back into the environment) using technologies and applications familiar to semiconductor packaging techniques. In the present application, the repurposing leads to the reduction of absolute levels of $CO_2$ in a given system. That system could be, but not limited to the atmosphere, ocean, a man-made solution, environment, etc. where size is not a limiting factor. Repurpose means not only efficiency at capture (or previously captured $CO_2$) but also generation of useful by-products such as $H_2$, $O_2$, and CO precursors (syngas). Additionally, it is also understood that plants use a strong capillary effect to transport fluids as natural pumps in nature. By using small vias, the capillary effect provides a "man-made" leaf/stem equivalency which helps to efficiently convert the $CO_2$ from a leaf/stem source and transform or reduce to CO and other useful by-products, $H_2$ and $O_2$ as additional materials with less power. It would also be advantageous to emulate a leaf's large open area structure to provide an improved catalytic surface for $CO_2$ reduction, hydrogen generation and a renewable energy platform that also assist with fuel cell efficiency.

SUMMARY OF THE INVENTION

In one aspect, the present invention is directed to a catalytic system for $CO_2$ capture and sequestration. The system includes a reduction cell for separating a carrier medium having an anode generating oxygen, a $CO_2$ cathode, and a CO precursor generating hydrogen from the carrier medium. In addition, the system includes a power supply for providing electrical power to the anode and the cathode. An electrolysis process occurs where oxygen, hydrogen, and the CO precursors are produced. The anode and the cathode include a plurality of geometrical constructs to increase an active surface area of a catalytic surface of the anode and cathode to increase an efficiency of the electrolysis process. The geometrical constructs may include vias and pillars. A capillary action is produced for $CO_2$ sequestration across the catalytic cathode surface.

DESCRIPTION OF THE INVENTION

Figure 1:
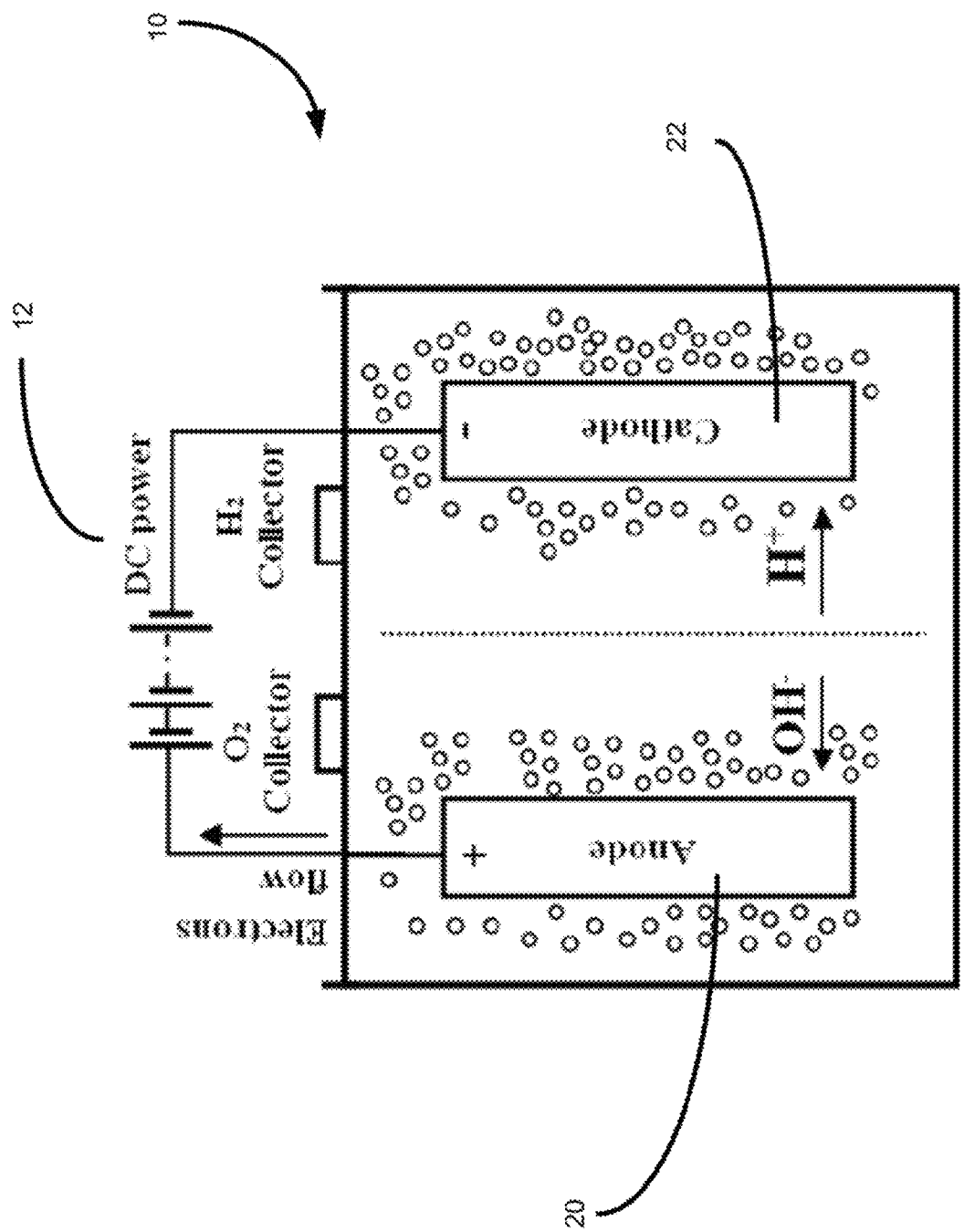
FIG. 1 illustrates a standard aqueous solution reduction cell (electrolysis) in one embodiment of the present invention.

The present invention is a system for increasing surface area (SA) utilizing a glass interposer construct with high density vias and pillars to function as a man-made leaf. Combining catalytic materials with increased surface area increases the activity of a catalytic layer such that a 4-inch equivalent area has the equivalency of a 4-foot active area. The vias, pillars and other structures, coated or not, provide the basis of equivalency. Small vias simulate the strong capillary effect that plants use to transport fluids as natural pumps in nature. This "man-made" leaf/stem equivalency has the capability to convert the $CO_2$ from a source and transform or reduce to CO and other useful by-products, $H_2$ and $O_2$ as additional materials.

There are several ways to capture $CO_2$ gas. One is to use natural water sources with dissolved $CO_2$. Two other simple and well understood processes for capturing $CO_2$ gas are available, dry water spray and bubbling. In one embodiment, a spray dryer using Sodium hydroxide (NaOH) or calcium hydroxide (CaOH), hydroxides to form carbonates, may be utilized. Spraying an atomized mist of water or other aqueous solution into a dense, hot gas atmosphere is effective at capturing the components in the heated gas flow. This well understood process is used in various industries for cleaning exhaust gases as well as a targeted fabrication process. As the mist evaporates, the water is highly effective at capturing the particulates in the hot air flow. This "dry spray" process also works very well at capturing hot $CO_2$ flue gas. Passing that vaporized gas over an active metal cathode yields target gases. Passing those same gases through high aspect ratio vias yields similar results with less electrical energy and, in the case of Pd, captures, filters, and purifies $H_2$. Adding NaOH or CaOH to the water improves the dry spray effectiveness as the $CO_2$ reacts with the basic solution to form carbonates. In another embodiment, a bubbler may be used to capture $CO_2$. A carbonic acid electrolyte is formed during the bubbling $CO_2$ into the water. The carbonic catalyst provides the efficiency for an electrolytic cell and the raw material to generate useable and sustained complexing carbon precursors and simple fuels. Renewable energy, such as wind and solar, may be utilized as it provides more than enough power for this minimal energy requirement process. Bubblers are simple gas feed systems that are the equivalent to an aquarium pump. Thus, in the present invention, bubbling $CO_2$ into CaOH or NaOH likewise forms a carbonate instead of the carbonic acid solution. The rate of $CO_2$ sequestration of the 1.5 g saturation in pure water may be exceeded. In either process, carbonate or carbonic acid, a Cu cathode facilitates the production on CO fuel gas. As noted earlier, electrolysis is carried out by supplying two electrodes with positive and negative potential to reduce and oxide the ions in the water to elemental gases of hydrogen and oxygen. The electrodes are typically inert metal such as platinum or stainless steel with a positive potential (anode) to yield $O_2$ and a negative potential (cathode) to yield hydrogen gas. Hydrogen appears at the cathode, where electrons enter the water (aqueous solution or other solvent carrier medium), yielding twice as much hydrogen as oxygen. Changing the cathode to Cu yields CO and/or $H_2$ in varying rates. As noted, when bubbled in water, $CO_2$ is captured forming carbonic acid. The resulting carbonic acid has a twofold purpose, $CO_2$ is captured into the electrolyte and the conductivity of the water is increased. By forming a bicarbonate ion without the sodium that results when using sodium bicarbonate, detrimental and aggressive NaOH solutions are avoided. Hydrogen gas is produced at the cathode if the correct target metal is selected. However, carbon monoxide is generated by selecting an alternative metal for the cathode. Various metals (which can be converted to the oxides of these metals) for the cathode/anode, that are typically used in the electronics packaging industry, electrolytic and electroless processes, may be used to target optimized CO and $H_2$ from $CO_2$ solutions. It is also possible to generate alcohols and other useful products in the liquids by selection of the appropriate metal plates and electrical potential.

In the basic electrolysis of water, typically two electrodes are used to separate $H_2O$ into $H_2$ and $O_2$. Hydrogen forms at the positive terminal, cathode and oxygen forms at the negative terminal, anode. With pure water this reaction is very slow as the potential to overcome the attraction of the molecules requires a few electron volts to make the water more electrically conductive. For increased efficiency, the correct catalysts and electrodes must be utilized to receive the desired reaction with the least energy. The desired reaction in the $CO_2$ to CO is given as follows:

$$CO_2+2H++2e-\rightarrow+CO+H_2O$$

The redox potential for this reaction is similar to that for hydrogen evolution in aqueous electrolytes. The electrochemical reduction of $CO_2$ is usually competitive with hydrogen evolution reaction in these electrochemical reactions. Typically, stainless steel or platinum electrodes are selected to yield $O_2$ and $H_2$. If a salt, such as sodium chloride were chosen, the chlorine in the NaCl would compete with oxygen yielding a toxic $Cl_2$ molecule with some residual NaOH in the water to attack electrodes. As discussed above, selecting NaOH provides the formation of carbonates making a more effective $CO_2$ capture system. But a copper/copper oxide, tin/tin oxide, and/or palladium/gold/platinum electrode is also acceptable for the $CO_2$ to CO system for the present invention.

Copper, palladium, nickel, tin, gold, and platinum are oftentimes materials used in the semiconductor packaging industry. Copper is used in electrical routings and pads for assemblies, pillars for attaching die to other die and printed circuit boards as well as fine wire bonding. Palladium is used as an oxide prevention material, similar to gold/platinum/ruthenium, on a number of metals to assure good solder wetting and strong metal-metal bonds. Low temperature melting tin and tin based alloys are used for attaching components. Nickel is used as a barrier layer and support structure to prevent consumption and formation of undesirable alloys. In one embodiment, copper pillars with tin caps as electrodes in an electrolysis like setup as a method to convert $CO_2$ to CO may be employed. In alternate embodiments, $H_2$, $O_2$ and other hydrocarbons may be prepared as well. A second wafer/electrode containing one or more additional materials, such as palladium, which also catalyzes $CO_2$ to CO may be used. The Pd also has a unique feature in that palladium is a natural filter for hydrogen. Thin films of Pd are more efficient than thick films such that processes, such as electroless, are very cost-effective solutions at producing the membranes. It is also possible that three and more chamber can be created with various iterations to target select by-product production and/or capture. Selecting copper over palladium cathode provides a known electrochemical yield advantage, but Pd provides another opportunity, as a $H_2$ membrane. While copper is up to 20 percent more efficient than palladium in producing CO, palladium provides dual functionality serving both as a cathode material and a thin film membrane that can simultaneously generate and serve as an in-situ $H_2$ filter.

Filters, pillars, membrane or through vias, may be employed to improve the effective surface area of the electrolytic production process. In addition to increasing effective surface areas, the materials and techniques used in electronics packaging may further increase, and target, sustainable harvesting of products from $CO_2$. By increasing the effective area of anodes and cathodes, possible multiple chamber systems, the present invention may be used as small, portable, fuel and energy harvesting/generation systems.

Constructs with the addition of material selection/design (pillars (copper capped with tin their oxides and other materials and their oxides) and through glass vias (lined with copper and tin) and possibly through vias with Pd membranes may be employed to increase CO/H yield. Water bumping is a process that is common in the die assembly world. Typically, a tin based solder is applied to a pad on a die or printed circuit board. This material is heated allowing the formation of a low temperature, but robust and reliable, metal to metal weld joint. In the past, most of these joints were formed with rounded balls of solder on round, square, rectangular or octagonal pads. Because the pads are round, there was a limit on how close the balls could be spaced or else they form electrical shorts. Packaging teams came up with a solution to this limitation by fabricating columns of copper metal called copper pillars. These copper pillars can be fabricated in high aspect ratio features to increase the effective surface area of the structure they are attached. By altering the materials, copper to copper oxide, other pure metals/methoxides, and alloys/alkoxides, it is possible to achieve a higher efficient chamber with targeted end product production using lower energy due to the enhanced electro-activity of the smaller structures per surface area. For example, these copper pillars replace the solder balls providing an opportunity for much tighter spacing. In the semiconductor packaging, the copper pillars serve as stand-off between adjacent surfaces preventing the two surfaces from collapsing on one another. Tin, discussed later, is used to "weld" these surfaces together. The copper pillar is the backbone of the assembly process but can also be the backbone of a $CO_2$ to CO conversion process. In one such fabrication process, copper pillars are fabricated by adding seed layers of metal to a wafer. The wafer can be silicon, glass, ceramic, or any other material. The next step is to apply and pattern a resist that has the desired feature geometry. By using thicker resist high aspect ratio (taller) features can be made. Ultimately, copper is plated to fill the open holes then the resist removed leaving behind a pillar of copper metal which is a standard process for the semiconductor packaging industry. Adding additional layers, as oxides or pure metals can be accomplished using atomic layer deposition (ALD) and may be incorporated in the present invention. For extremely high aspect ratio, coating ALD is required whereas chemical vapor deposition (CVD), physical vapor deposition (PVD), e-beam and sputtering, etc. are acceptable for moderate aspect ratios, coatings, and layering.

Through glass vias (TGVs) may be fabricated with 20:1 or greater aspect ratios. The challenge has been to coat these vias with robust and hermetically sealed layers. With 20 um diameter, a limit of ~275-300 um is capped. The present invention may utilize ALD as a solution for robust layering for deeper vias. Thin ALD layers also provide unique electrochemical processing that might further improve the catalytic effects. These deep vias are required for supporting strength and handling of the material. An additional benefit is the smaller diameter vias support stronger capillary effects. Such a system minimizes the need for a pumping system, further reducing the overall required system energy input.

A small diameter via has a strong capillary component. These small diameter, high aspect ratio vias have a good ability to draw solution and can also be used as membranes. By adding the correct metals, electrical bias couple with correct via size, it is possible to mitigate migration of solutions, maintain correct pH balance in areas of the electrolytic cell and generate targeted materials. Combined with the via geometry and density, it is possible to achieve ultra-high area density in up to and in excess of 15,000 percent over a standard metal plate. The vias begin to behave like a million controlled tiny straws.

In one embodiment of the present invention, current is delivered to each pillar by electrically routing traces and/or wiring. Similar to a thermal couple, there is also a potential generated between dissimilar metals that can be used to generate power. Pillars may be mounted on a blanket conductive layer or copper traces that may be routed on the wafer and connected to a common power node. In the routing mode, targeted pillars or vias can be turned on and off to allow "selectivity" of material production. A simple circuit may also be fabricated to monitor pH, current density in the bath, temperature, etc. for control that existing designs do not provide. Antennae and inductors may be added to the system, thereby providing wireless/remote transfer of energy and/or data to and from the system.

In another standard packaging fabrication process, routings are made by adding copper seeds, patterning then growing the traces. The seed layers are etched away leaving the thicker routing. The routing is then covered with polymer followed by using the pillar growing process, which is a well-documented, understood, controlled, economical and reliable process. The polymer serves to protect the copper electrical routing from chemical attacks and prevents shorting between traces. Other routing techniques are available as well, but this copper routing is described as one of many techniques which may be utilized in the present invention. The metal may be evaporated in a liftoff like process as one other example. Hybrid designs may be developed to optimize to support best design, optimum cost and fit for multiple solutions. But one other item to make the process more efficient is the usage of tin. Tin or tin alloys are typically used to provide the metallurgical joining between components in semiconductor packaging. Other metals, oxides and materials may be applied to the pillar/via application, such as Sn, SnO and Sn alloys to optimize efficiency. It should be understood, the materials listed above is not a limiting list and other materials (such as In, Bi, Pb, Sn, Au, Pd, Cu, Ag, etc. are but a few, including their oxides and alloys) may be used. Adding tin is accomplished by continuing the pillar building process. Instead of terminating the process after copper plating, the sample may be immersed in a tin plating bath (electroless or electrolytic) or placed in a metal deposition chamber (such as ALD, e-beam, sputter, etc.) to add the tin cap surface layer. It has been demonstrated that adding tin improves the conversion of carbonate to CO efficiency to over 90%. Adding that inexpensive cap of tin (or tin based materials) demonstrates a $CO_2$ sequestration system that is almost directly in-line and equivalent with the processes and fabrication solutions used by in the semiconductor packaging industry and might be instrumental in helping reduce the $CO_2$ greenhouse gas level in the environment. It is also possible to completely immerse the Cu-based layer with Sn based materials. Analyzing the products will help determine material and selectivity, including but not limited to, oxides, other metals and/or their oxides, and plated through via solutions. As discussed above, inductors and/or antenna may be added to provide energy harvesting/transfer. It is also possible the correct tuning of an antenna-like or inductor-like device may yield splitting of the electrolyte for production of targeted products. The correct design may generate a frequency, similar to microwave, that optimizes the splitting of water, energizing water, or even target the splitting of the materials in the system, such as carbonates, or $CO_2$ itself, to split, energize, catalyze, etc. the solution wirelessly.

Although descriptions discussed above and described in the figures below may discuss aqueous solutions, the present invention may be utilized with any solvent carrier (e.g., aqueous solution, air, aerosol, ocean/terrestrial water, other hydrocarbons, or other types of solvent carriers) and still remain in the scope of the present invention. FIG. 1 illustrates a standard aqueous solution reduction cell 10 in one embodiment of the present invention 10. In this embodiment of the present invention, electrodes are powered with a DC current 12 is supplied through the circuit to generate oxygen ($O_2$) at an anode 20 and hydrogen ($H_2$) at a cathode 22. These electrodes are typically stainless steel in the aqueous solution (solvent carrier) reduction process, but the electrodes may be constructed of any metal or materials capable of transferring electrical current such as mesh, conductive metal oxides, etc. The electrodes may take any shape, the electrodes may be round, rectangular, square, or any geometrical shape to fit the cell. For illustrative purposes only, the plates are rectangular and constructed of stainless steel. For an efficient process, an electrolyte is added to make the water, other aqueous solution, or solvent carrier more electrically conductive. Bubbled $CO_2$ similarly increase conductivity by making water more acidic forming carbonic acid. The present invention shows an increased efficiency at converting $CO_2$ to useful products, such as CO, and how a plate with palladium metal can be used to both improve purity, process efficiency, and possibly support development of a small engine/power source possibly serving as a battery source.

Figure 2:
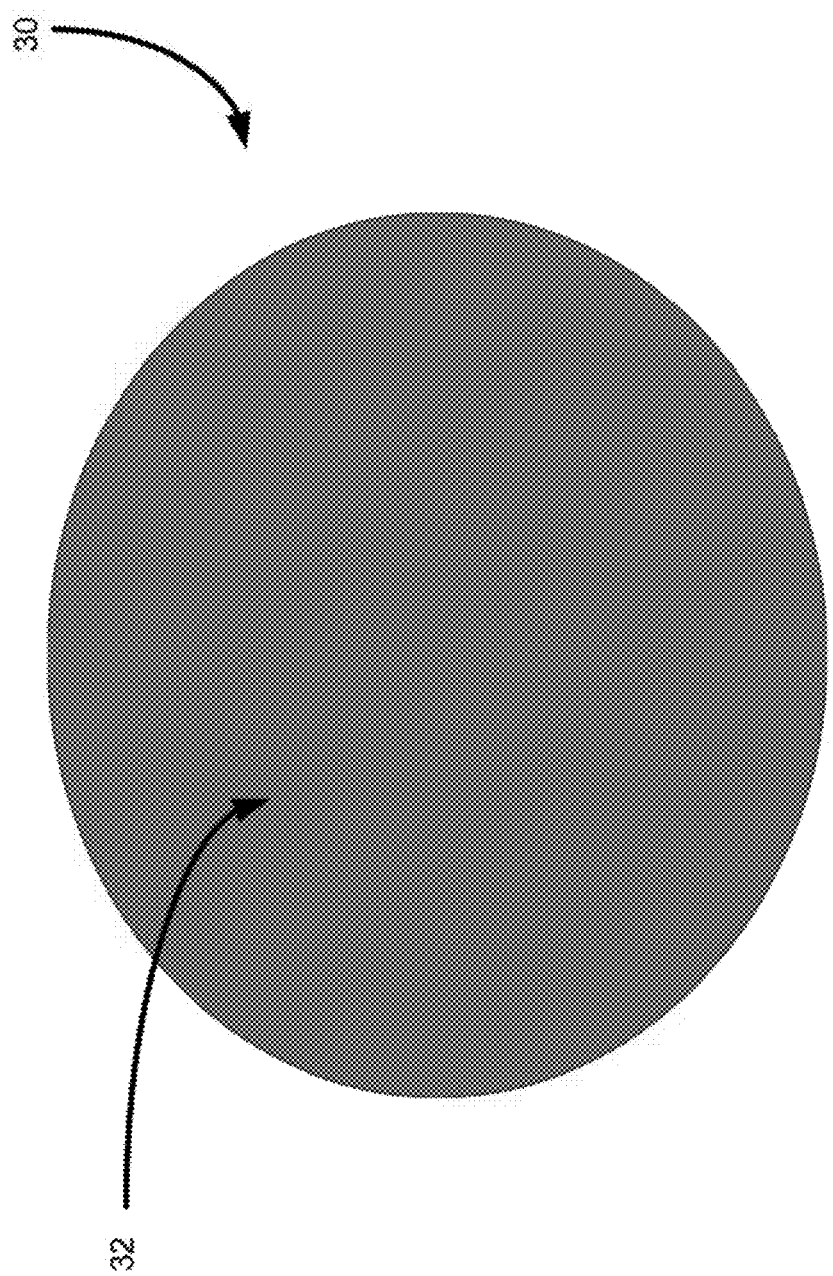
FIG. 2 illustrates a top view of a round electrode in one embodiment of the present invention.

FIG. 2 illustrates a top view of a round electrode 30 in one embodiment of the present invention. The round electrode 30 includes an active surface 32, which is the surface of the wafer (electrode). The surface area on each side is defined as $SA=\pi r^2$. Thus, the active surface area includes the top and bottom of the plate or electrode 30, with negligible effects from the side for a thin plate. As depicted, the electrode 30 is a wafer.

Figure 3:
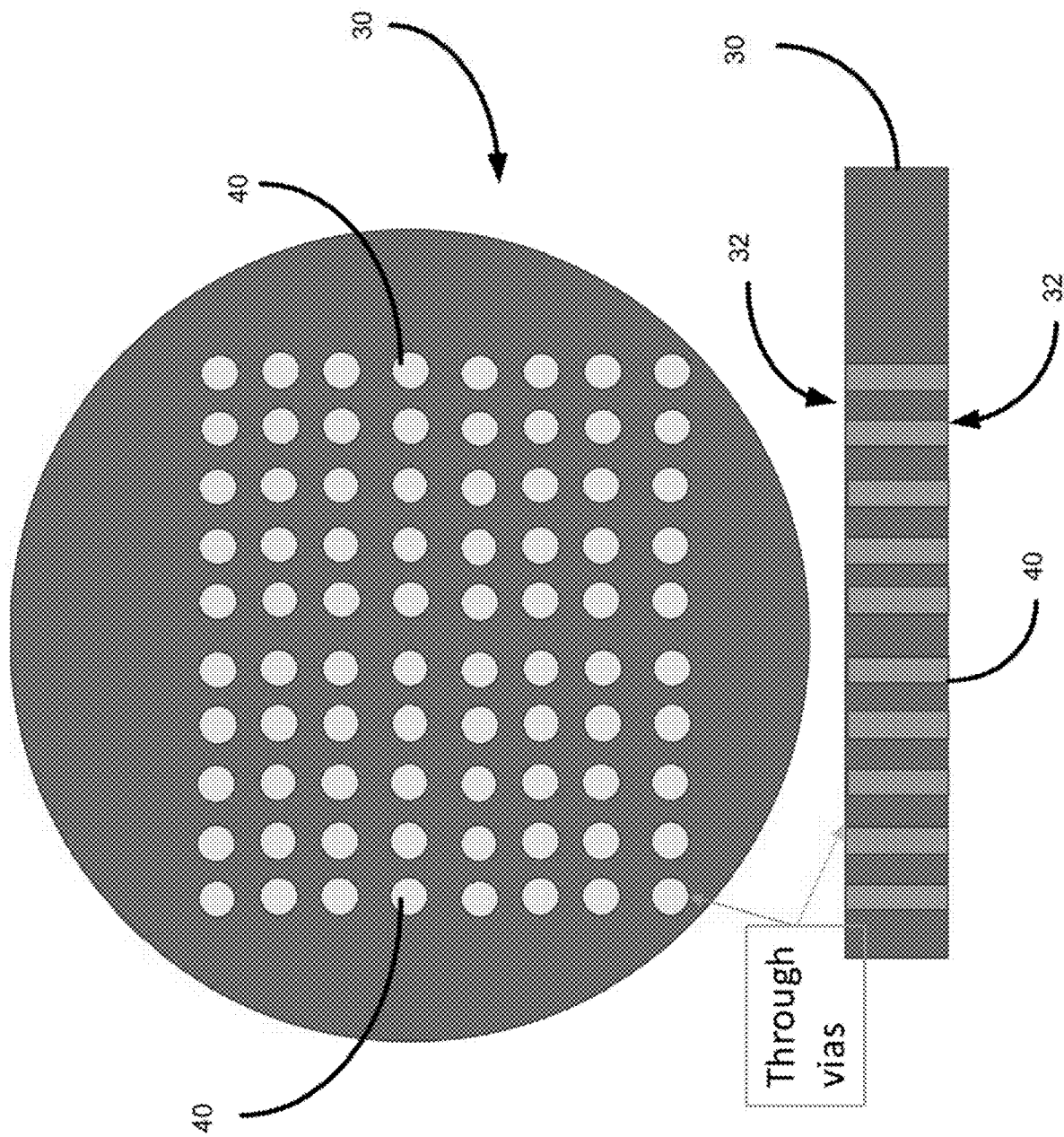
FIG. 3 are top and side views of the round electrode having a plurality of vias.
Figure 4:
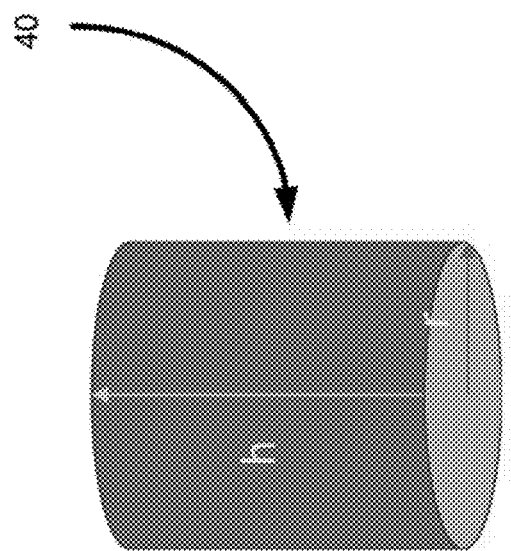
FIG. 4 is a side view of a view showing dimensions for a single via.

As discussed above, an increased surface results from the addition of vias. FIG. 3 are top and side views of the round electrode 30 having a plurality of vias 40. In the case of a circular via 40, the area of each via 40 is defined by the area of a "internal" cylinder, $SA=2\pi rh+2\pi r^2$. FIG. 4 is a side view of a view showing dimensions height h and radius r for a single via 40. The dimensions illustrated in FIG. 4 are used for calculating the additional surface area of the via 40. Each via 40 provides an additional surface area such that one million vias would increase the active surface area by $10^6 \times SA$. A 4-inch wafer could have an increased surface area by over 130 times depending on the via geometry and quantity. Additionally, capillary effects of the lined via eliminates/reduces the need for a pumping system and smaller size (simulating nanoparticles) makes for a more chemically/catalytically active structure.

Figure 5:
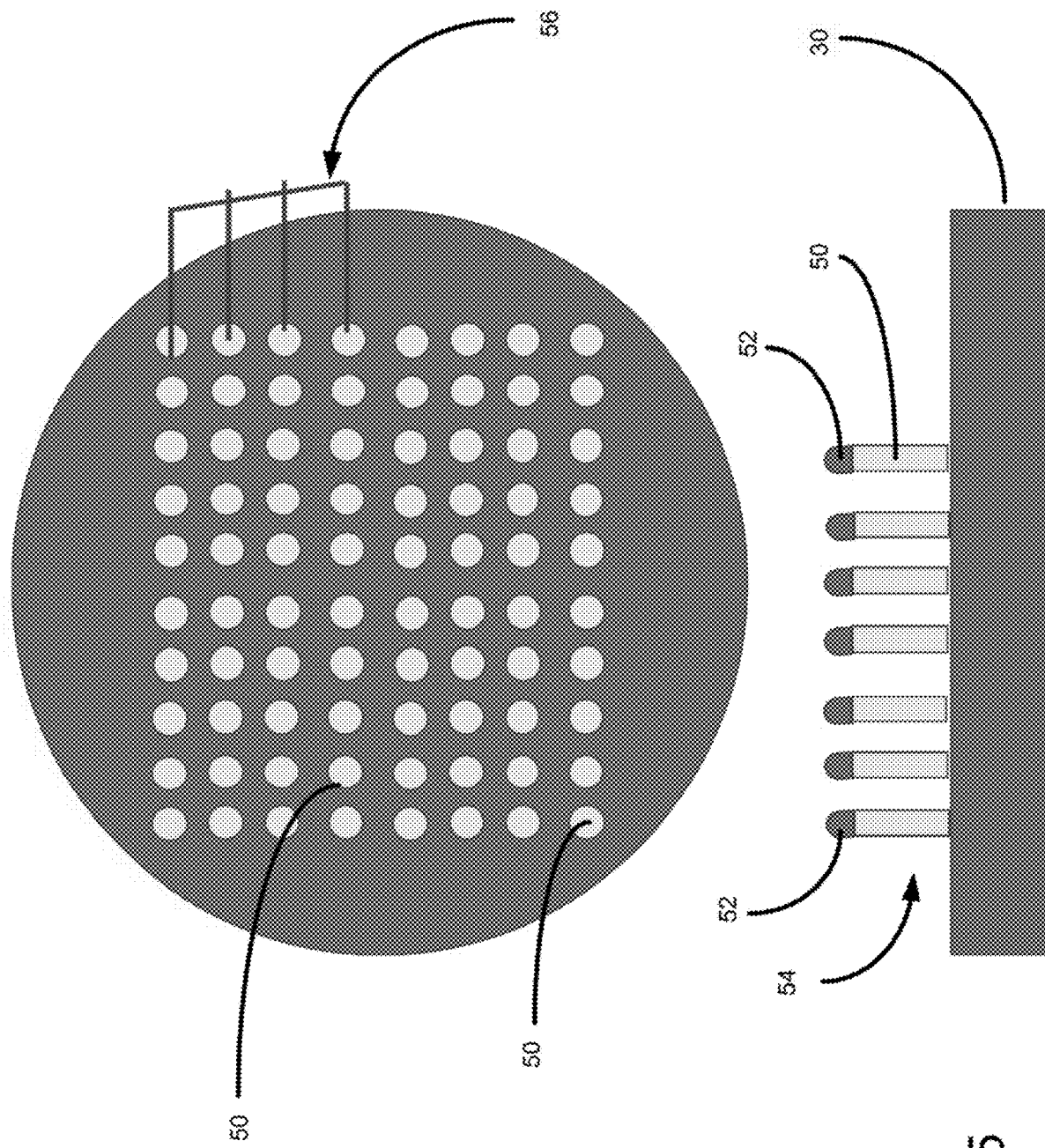
FIG. 5 is a top and side view of the electrode having a plurality of pillars.

To increase the active area even more, a cap structure (bumped pillar) may be utilized. FIG. 5 is a top and side view of the electrode 30 having a plurality of pillars 50. The pillars 50 (e.g., constructed of copper) may include a cap 52 (constructed of tin or tin alloy in one example) forming a bumped pillar 54 embodiment, further increasing the active area. The total surface area is defined as the surface area of the cylinder plus the surface area of the cap, where the cap is represented as an ½ sphere (sphere has $SA=4\pi r^2$). Total area of each bumped pillar 54 is equivalent to $SA_t=2\pi rh+2\pi r^2+2\pi r^2$ multiplied by the total number of structures. Each via adds its surface area to the total by a multiplicity. One million pillars (or pillars+caps) add an area of $10^6 \times SA_t$ in addition to the surface area of the wafer. Such an increase in surface area is typical in a wafer bumping with up to a few hundred million or more vias being added to even a small wafer. Pillars can increase the overall surface area by up to and over 80 times depending on the wafer size. Pillars may also increase the chemical activity of the layer as the smaller geometry providing nano-like chemical effects. Electrical traces/routing 56 may be added to selectively turn on and off specific pillars to target specific results, such as gas selectivity, electrolyte generation, biomaterials, hydrogen filtration/recovery, etc. Metal routings to a pad may be utilized. Those pads may also work as antennae. The body of the metal routing forms an optional coil which may be wireless while also serving as a catalytic layer copper layer that may be coated completely or partially with a tin based alloy. Pillars may also be fabricated directly on the winding or pads.

Figure 6:
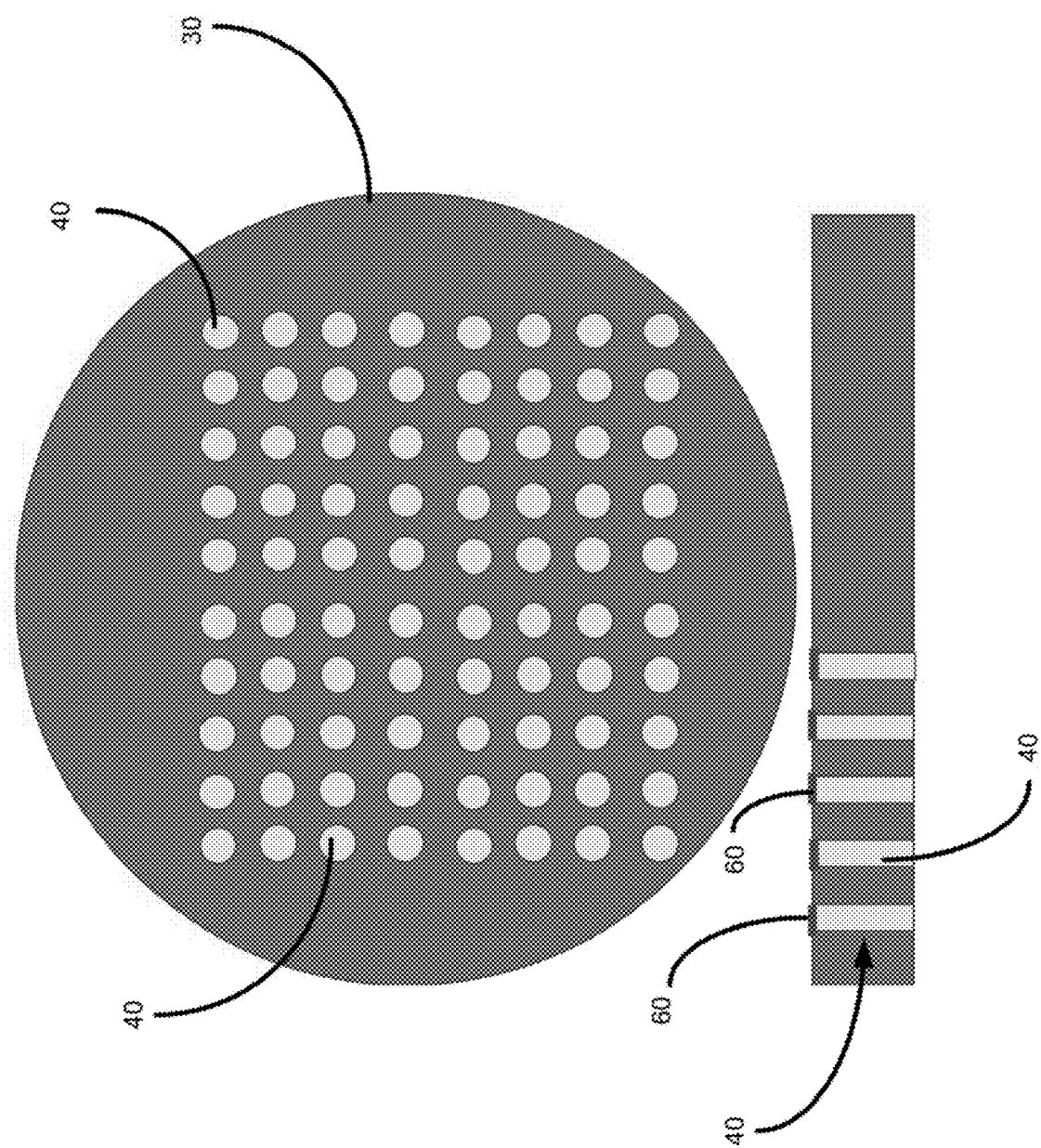
FIG. 6 is a top and side view of the electrode having a plurality of vias having palladium metal caps.

FIG. 6 is a top and side view of the electrode 30 having vias 40, each having a palladium metal cap 60. Palladium is a natural filter for hydrogen. In one embodiment, the vias 40 are capped with palladium metal to allow $H_2$ gas to pass, while entrapping other materials. A thin film membrane of Pd serves as an excellent, and strongly active $H_2$ filter allowing for purification of other gases in the electrolysis or pure $H_2$ capture. For example, in a carbonate capture system, CO and $H_2$ are two of the gases generated at the cathode when a catalytic metal is used, such as copper and tin, in a $CO_2$ sequestration system. The Pd filter may be used to block CO yet passes $H_2$ for pure $H_2$ gas at one collection point and CO at the other. In other embodiments, other metals, materials, or membranes may be used in place of Pd. In another embodiment, Pd may be used to line the via, thereby providing an active layer for $H_2$ generation or filtration. In addition, electrical routing 56 (shown in FIG. 5) may be used to add selectivity and current to and/or from a target layer, structure, or surface.

Figure 7:
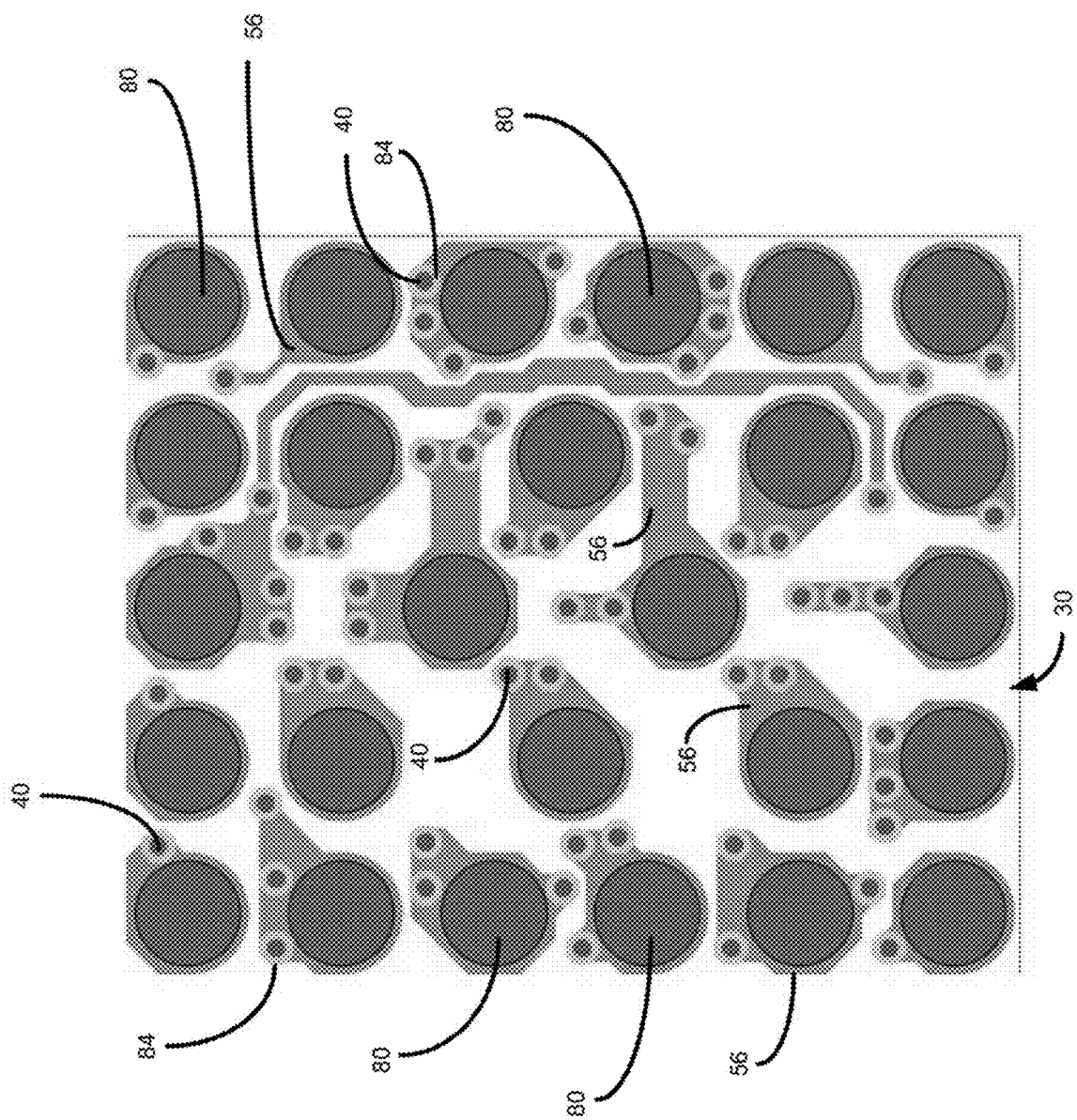
FIG. 7 illustrates a top view of an electrode having a plurality of vias and structures in another embodiment of the present invention.

FIG. 7 illustrates a top view of an electrode 30 having a plurality of vias 40, copper pillars 80 with tin caps and electrical routing 56. A catalytic metal 84 is located in the vias 40. Structures may also be fabricated that function or operate like coils, pads, patch, etc. or other geometrical structures to support fabrication of inductors or antennae or energy harvesting. With such structures, not only can the pads serve as electrodes in the typical circuit where current is supplied via "wired" interface, these structures support using wireless features that can be powered up to serve as electrodes or even in the microwave range and any other frequency to manipulate the electrolyte, by-products, or energy potential. With small size, higher frequencies can be obtained and once again, the structures add the benefit of behaving similar to enhanced chemically active nano-like particles. It is possible to add combinations of pillars, wireless, routing, vias, etc. for the most useful and efficient end system.

The electronics packaging industry provides a possible platform to transform $CO_2$ to useful products. The attachment of semiconductor die to substrates involves fabrication of high aspect ratio metalized via contacts and micron scale geometrical features using metal constructs. These same metals (and their oxides), as well others, are capable of providing catalytic surfaces for $CO_2$ conversion to renewable resources. Similarly, these structures and catalysts have the capability to improve the generation of CO, $H_2$ and $O_2$ in electrolysis-like systems. The present invention utilizes three dimensional (3D) structures that provide a breakthrough solution yielding a catalytic platform for reducing $CO_2$ in the environment. Although the use of copper, tin and their oxides are discussed, the present invention may utilize other metals/oxide solutions selected for catalytic layers. The present invention may utilize higher density geometric constructs such as "pillars" and ultra-high aspect via fabrication in glass, deposition of catalytic films, and improving the catalytic surface area of films by over 1400% (140×) in $CO_2$ to CO sequestration. In the present invention, the geometric constructs may be any shape and still remain in the scope of the present invention.

The electronics industry provides techniques and process which may be utilized in the renewable energy industry. The electronics industry is continuously striving for smaller packaging and high-density substrates for 3D packaging. One such solution demonstrates promise for reduction in global $CO_2$ reduction and efficient $H_2$ production, specifically through glass interposers (or ceramic, silicon, etc.) having vias as small as 20 um diameter and up to 500 um deep. These high aspect ratio vias not only increase the active surface area, but also the capillary effects of these vias present themselves as a sustained pumping system with little outside energy required. As a result, these small vias can also be used as filtration systems, electrophoresis, blood filtering and algae filtration (controlled particle size). In addition to the vias, pillars can also be fabricated as an option to increase surface area as well. An additional packaging solution demonstrates its possible to route metal to these vias and pillars for both photo and electro energy as needed. Because of the small size, the features behave more like nanoparticles than their macro counterparts. If an outside energy generation system, such as solar or photocatalytic layers (like metal/oxides) are utilized, even higher energy efficiencies are possible, increasing the chance for portability.

The present invention provides a system to generate biogases and possible inserts for factories to reduce $CO_2$ emissions using the CuxOy (or similar) catalysts. Because of the large global market and the desire to reduce $CO_2$ emissions and improve renewable energy sources ($H_2$ generation), the present invention provides several embodiments, from portable home solutions to large industrial application that may be fabricated with the catalytic high-density interposers. The present invention effectively converts $CO_2$ to CO while also sequestering $H_2$ and $O_2$ more efficiently with targeted catalyst on a high-density surface area. By default, a catalyst is the most effective when the surface area is increased. Increasing the area for reactivity makes any catalyst more effective. In the constructs that will result, the effective surface area of any catalyst improve by increases over 400% than the simple flat catalytic surface alone. For example, a flat catalytic plate is the area of that plate alone. Adding vias increase that same plate by the additional area of each construct. These constructs devise a system to generate biogases and possible inserts for factories to reduce $CO_2$ emissions using the CuxOy/SnO (or equivalent) catalysts. Another embodiment to the present invention involves fabricating $H_2$ generator systems (with the Pd inserts). Palladium (pd) is a natural filter for hydrogen gas; $H_2$ readily passes through Pd and is used to purify $H_2$ in other systems. Pd can serve as both and cathode and filter to generate $H_2$.

Plants use capillary and transpiration to transport materials hundreds of feet using the capillary effects of "vias"/stems. A via transport system in glass works similarly with liquids or gases moving through the vias coated with the correct metal/metal oxide system, to convert aqueous or aqueous like system to CO, $H_2$ and $O_2$. Similarly, non-aqueous based systems can be used as well when $CO_2$ interfaces with the catalytic layers (gas, steam, finely ground particles, etc.). This results in a shrinkage in the size of a $CO_2$ to CO generation system supporting portability while further reducing roadblocks to implementation. Glass via interposers may be used in the medical field for controlled geometry neural e-contact, drug delivery, biological filtration, and capillary electrophoresis. High aspect TGVs mimic capillary effect plants used for water transport. A thick substrate with capillaries can facilitate a sustainable, low power, transport system. The glass via interposers may be used in the renewable energy industry where the catalytic surface area is increased up to 1200% coupled with fabricated micro-electromechanical system (MEMS) structures to convert $CO_2$ to CO and filtration of algae systems for biofuels. The present invention may also be applied to the industrial sector, where 25:1 up to 150:1 with lined vias for catalytic reactions. Smaller diameter vias support much strong capillary effects mimicking nano scale reactants.

A select group of metals and metal oxides are able to catalyze $CO_2$ to CO to generate renewable energy (biogases). Similarly, some metal and metal oxide systems can generate $H_2$ in aqueous systems with little to no outside electrical current. For sake of simplicity and without going into detail on each metal and metal oxide system, the Cu and Sn system, their oxides, along with Au and Pd, are solutions being discussed. For reference, these same metals are used in semiconductor packaging and are critical for electrical routing and baseline structural formation. The present invention utilizes high-density glass interposers as substrates or using equivalent materials such as silicon, or silicon nitride, quartz, etc., in a similar embodiment which results in substantial increases in the catalytic surface area of a "cell cathode/anode" resulting in an innovative, commercially viable, efficient system for $CO_2$ sequestration and energy generation. Electrical contact is routed to the structures when needed. During fabrication, it is also possible to add a layer or photoactive layers to make a solar power generation system to power any electrical needs. In one embodiment, a series of MEMS structures are added and the transpiration process of fluids moving can also generate an aqua motor to generate electro/mechanical power.

The high aspect ratio vias and pillars make it possible to increase the active surface area of a catalytic cathode from 400% to over 1200% making it possible to mimic the capillary transport mechanisms plants use to move water nutrients as high as hundreds of feet in trees with little to no input electrical energy. A low energy, high aspect via solution, pumpless, would reduce the barriers for implementation and have high societal impact for $CO_2$ sequestration and support renewable energy. Seawater, high in $CO_2$, or terrestrial hard water sources (high in dissolved carbonates/$CO_2$), could be used in portable as well as large scale sequestration with a glass substrate combined with durable, reactive metals. The splitting of any transport material (gas, liquid, solution, etc.) creates a dissociation and would be equivalent to the evaporation at a plants leaf to have a delta in pressure to continuously pull material through the capillary or active surface area creating an additive pumping force in addition to the capillary action The tallest trees and every leaf in nature use capillary effect and transpiration to transport fluids from a few millimeters to hundreds of feet. The transpiration occurs as gases are generated and escapes from the surface Veins (capillaries) in leaves, stems and the inner most layers of trunks of trees transport aqueous solutions where they interact with leaves to produce complex sugars using $CO_2$ via photosynthesis. Man-made small high aspect ratio vias in glass produce high capillary forces, increase surface area, and suggest methods to catalyze materials, i.e., man-made leaves. Microfluidic capillary effects may be utilized in the present invention. Microfluidics concerns the control or transport of small volumes of fluid through porous material or narrow channels for a variety of applications including mixing, separations, electrophoresis, etc. Capillary pressure is a geometry-related characteristic that can be altered in a microfluidic device to optimize a certain process. For instance, as the capillary pressure increases, a wettable surface in a channel pulls the liquid through the conduit. This eliminates the need for a pump in the system and can make the desired process completely autonomous. The capillary pressure in a microchannel is shown as:

$$p_x = -\gamma\left(\frac{\cos\theta_b + \cos\theta_t}{d} + \frac{\cos\theta_l + \cos\theta_r}{w}\right)$$

where:
Y is the surface tension of the liquid
$\theta_b$ is the contact angle at the bottom
$\theta_t$ is the contact angle at the top
$\theta_l$ is the contact angle at the left side of the channel
$\theta_r$ is the contact angles at the right side of the channel
d is the depth
w is the width For this embodiment, the capillary pressure changes when the surface tension of the fluid, contact angles of the fluid, or the depth and width of the device channels changes. To change the surface tension, one can apply an equivalent "surfactant" to the capillary walls, where the dissolved $CO_2$ in solution behaves as a surfactant. The contact angles vary by sudden expansion or contraction within the device channels. A positive capillary pressure represents a value on the fluid flow, while a negative pressure represents the fluid being pulled into the microchannel. A negative partial pressure occurs at the surface when the solution is split into constituents and "evaporates", resulting in man-made transpiration. In one embodiment, the surfactants are the coated catalytic sidewalls. The agent through the vias changes based on composition. Additionally, the capillary pressure changes as the width of the vias and thickness (depth) changes. In the end, a self-sustaining pumping system is realized.

Glass is preferably utilized rather than other materials as glass provides durability, inertness and ease of fabrication while serving as a platform for micro features and vias. Fabricated glass devices in the 100 to 200 microns thick are marginally robust enough to use structurally. The end solutions expand the offerings to develop a thicker platform with higher aspect ratios (thickness over 500 um to 750 um; goals exceeding 1 mm) which provide both robust structural support as well as increased capillary force. Due to their small geometrical sizes, when these vias are lined with the reactive metals, they behave similar to nanoparticles in activity with much more reactivity than their bulk metal counterparts.

The process of making anisotropic through vias in glass has been demonstrated using lasers and etching solutions. Lasers create thermal damage, entry and exit hole diameter variation is common and lasers take up to 7 times additional fabrication time so higher volume density and smaller features require etching solutions. In some cases, pillars, or other geometric structures (constructs), might be used to increase surface area or based on the selected catalyst required. Regardless, pillars can increase surface area dramatically and likewise support direct metal routing for electrical solutions as needed. The vias are then coated with catalysts that serve as adhesion and seed metal/metal oxide layers. Smaller aspect ratio vias may be coated with e-beam or sputter tools but are not adequate for ultra-high aspect ratio vias. In one embodiment, ALD is used as it has the capability to conformally coat even the smallest diameter, high aspect features. The vias may be coated in a range from 20 um to 40 um diameters up to 500 um to 750 um thick. The adhesion/catalytic layer (adhesion and seed/catalytic) layers may be used as these materials.

In one embodiment, an ultra-high-density glass substrate platform with a variety of commercial, environmental, and societal benefits is created, which provides combinations of vias, pillars and metal routing to address $CO_2$ sequestration. $H_2$ generation and renewable resources.

$CO_2$ to CO and efficient $H_2$ generation may be demonstrated in both a 3D interposer and a high activity catalyst. One method of creating such a system involves the following steps. First, high aspect ratio pillars of Cu are fabricated. For this first step, the process is designed to convert to $Cu_xO$. Electrical routing is added and covered with passivation to protect the routing (as needed). Sn and $SnO_x$ caps are fabricated and added to the pillars. The $SnO_x$ pillars are then evaluated. In the next step. $CO_2$ solutions are determined to convert to CO. A $CO_2$ saturated solution, $CO_2$ seltzer, crushed limestone may be utilized. The system uses air with $CO_2$ which may be obtained using $CO_2$ concentrators. Basic conversation of $CO_2$ to CO and $H_2$ production and $O_2$ generation are determined, such as using metal solutions: $Cu/Cu_xO$ and $Sn/SnO_x$ for $CO_2$ to CO. In the next step, high aspect glass vias are fabricated and coated. In the next step, high capillary/transpiration device solutions are determined such as: inorganic twig; inorganic leaf; $Cu_xO_y/SnO$ on other vias for CO capture; reaction when combined; carbonate water reaction then combined with $H_2$; reaction of CO with $H_2$ using $Cu_xO_y$, Zn, or others; and Pd filters $H_2$.

Glass interposers (with pillars and vias) may be used in a wide variety of industries, such as medicine, biomedicine, military, optics, space, renewable energy, and electronics. Glass provides the best option for through via technology as glass can be patterned anisotropically providing much tighter pitch. Glass is also inert and provides strong bonds between the active metal catalyst. Not only can glass support higher density solutions, but glass is also cheaper to process than its closest competitor, silicon, or ceramic solutions. Standard glass interposers can be fabricated in the 80 um to 120 um pitch range with a 10:1 aspect ratio. Higher surface areas result when the fabricated structures are 40:1 aspect ratio with 40 um and 50 um vias. Additional constructs, with similar or smaller via diameters, at depths of 500 um to 1 mm (2 mm depth further increases aspect ratio) may be used. The increased interposer density allows for much higher surface area. More vias and higher aspect ratios yield more active surface area with each via behaving as a separate catalytic device. By multiplying the millions to billions of vias over a given area, it is possible to shrink an effective 4-foot wafer area to a comparative 4-inch wafer solution.

Coating of the via walls is required to provide an active electrical contact and/or catalytic surface. Most deposition tools are not optimized to coat high aspect ratio vias with materials. Atomic layer deposition (ALD) is used to coat these sidewalls. After via fabrication and coating, the final task required is the filling of those vias with additional catalysts. The capillary effects of the vias themselves are well demonstrated at this point of the process.

Capillary action is the process used in nature to transport water and nutrients in plants, our bodies, and other man-made systems. The narrow coated vias, ultra-high density, with high aspect ratios provides a solution for $CO_2$ sequestration. These same vias self-prime liquids or gases containing $CO_2$ across the catalyzed surface converting $CO_2$ to useful materials, reducing the amounts of $CO_2$ in exhaust, terrestrial and aquatic environments. In addition to a manmade leaf, the solutions here have broader applications in semiconductor packaging, optical imaging, medical and environmental applications.

High density packaging results in a high surface area catalyst. As noted, fabrication of a high-density TGV assembly provides a platform for many applications. Decreasing the pitch on an interposer from 100 um to 20 um or less provides a higher number of vias. Similarly, a pillar (geometrical construct) with smaller diameter and tighter pitch also increases the equivalent surface area. Electrical routing may be made for these structures as well. Vias provide additional functionality compared to pillars. These same vias in inert glass may be used in applications with small, controlled vias geometries, such as filtration. In some filtration operations, biological and/or non-biological, a benefit not only is gained from the increase in several orders of magnitude higher surface, but by having metals that might serve as active bioagents (like silver), or by routing an electrical charge to the construct, one can add controlled selectivity (of output materials), sterilization, or other controls. These small vias/pillars, with the appropriate catalyst, make it possible to improve natures efficiency at $CO_2$ consumption. An artificial stem where electrical connections may be added (by redistribution layer metal routing) as needed to generate targeted precursor materials. Glass vias may support over 1200% more active surface area for the catalyst with higher densities possible.

Cu and Sn (and their oxides) may be used to convert $CO_2$ to CO and other precursor biomaterials. In one application, purposely converting the pillar surface to $Cu_2O$ and adding a biasing current to the pillars, the carbon monoxide generation begins. Similar metal and metal oxide systems can also efficiently generate $H_2$ at the cathode. By using a Pd "trap", $H_2$ can not only be generated but filtered for purity as Pd is a natural $H_2$ filter.

Figure 8:
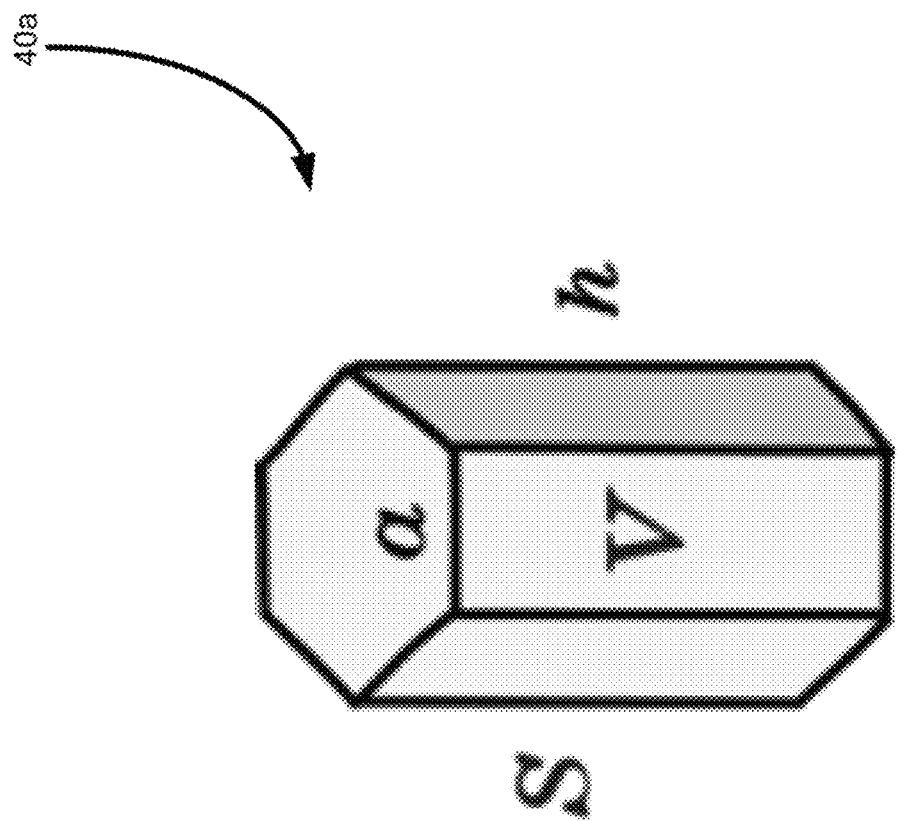
FIG. 8 is a front view of a hexagonal via.

Semiconductor technology has a never-ending goal to increase the amount of technology that can fit in a given area. No longer are x and y the constraints in 'board-like' designs; the next direction is z. As with terrestrial real estate, tall buildings replace smaller structures to increase the amount of estate that can be placed into a given area. In semiconductors, this new conceptualization in area density is 3D packaging with key packaging strategies being pillar structures for die-to-die attachment and through vias for top to bottom component connectivity. Pillars, typically copper structures capped with tin, replace solder balls/bumps as the assembly of choice method. A copper pillar provides higher density interconnect due to the more used available area and fabrication techniques as small as a few microns. When compared to other geometrical shapes, a hexagon to support a honeycombed embodiment provides the most efficient use of available area. FIG. 8 is a front view of a hexagonal via 40a where a is the hexagon base's edge length, h is the height of the prism and SA is the surface area of the entire hexagonal via:

$$SA = 6ah + 3\sqrt{3} \cdot a^2$$

Hexagons have a honeycombed area that provides an efficient use of space, where dead space is eliminated. FIG. 8 represents a honeycombed structure. Such a structure, instead of using round cylindrical vias, would increase the usage of available wafer resources, further increasing the efficiency of the catalytic structure.

Pillars occupy the surface area of a catalytic face with high aspect ratios, which results in an increased overall surface area on the catalytic surface. Simply fabricating 40 um diameter pillars 75 um tall, compared to a blank copper anode, increases the surface area of a 4-inch wafer by over 400% (40×). Further reducing these structures and maintaining a similar height (increase aspect ratio) can increase the surface area well by 1000%. For reference, expensive Cu nanoparticles "glued" to a wafer surface are randomly attached, poorly adhered and have marginal electrical contact. Copper pillars have precise placement, exquisitely controlled geometries, carefully designed electrical connections, and are less expensive to manufacture than nanoparticles.

Vias are more difficult to fabricate but add the benefit of much higher density I/O (for 3D packages) than pillars, capillary action/effects (artificial twig/leaf) minimizing the need for flow systems, and the potential for hydrogen production and filtration. Processes exist to fabricate vias using silicon, glass, or other dielectrics. Through glass vias (TGV) may be fabricated with extremely high density, initially with ~20 um side walls between holes, and with high aspect ratios. A 40 um diameter via with 70 um pitch can increase the active surface area to over 1200% (120×) and well over 3000% (300×) depending on geometry and interposer density; coating those vias with metals (and oxides) provides the catalytic interface to convert $CO_2$ to CO and other precursor materials. Capping a cathode via with a thin Pd layer provides a natural filter to generate and produce H2. The via approach has an advantage over pillars in that vias provide capillary action that are self-priming and can be used to generate mechanical force (higher process efficiency). The via process is the basis for an artificial "stem", transpiration, where inserted into $CO_2$ infused materials provides CO on the opposite end with minimal power consumption. While pillars or surface structures do provide increase surface area, the capillary force is not provided with surface structures. Once the vias are fabricated, the layers may be stripped and refinished to minimize overall cost of use.

Regardless if the structure is a via or pillar, a high-density interposer has a dual use purpose that includes $CO_2$ reduction and $H_2/O_2$ generation. $CO/H_2$ generation system may use copper pillars capped with solderable tin alloys. Current technologies support copper, tin, gold, palladium, titanium, silver and a few other metals and their oxides and are easily adaptable for a $CO/H_2$ generation system. The same materials as used in electronics packaging have demonstrated dual use in $CO_2$ sequestration to generate CO or other biogas and fuels. As noted, Cu pillars are fabricated as the base structure for standoff and electrical contact, capped with solderable metal such as Sn alloys, demonstrate promise in converting $CO_2$ to CO. Cu, $Cu_xO$, Sn and $SnO_x$ are effective catalytic materials in converting $CO_2$ to CO. Area increases with pillars can be over 400% and self-priming vias over 1200% with current geometries. The size of a $CO_2$ to CO generation system may shrink, supporting portability and reducing roadblocks to implementation. A 4-inch diameter wafer could generate the same surface areas as a 4 ft² Cu plate. A typical set of 25 catalytic glass wafers weigh less than 3 lbs and is smaller than a loaf of bread whereas 25 copper plate catalysts (that are 4 ft²) would be the size of a small car and weigh well over 5000 lbs for a ¼ in thick plate.

For the fabrication of interposers, glass is preferably used for its inertness, durability, and its ability to form excellent glass to metal seals. Glass is an amorphous material comprised of oxides of silicon, aluminum, boron, lead, and sodium to name a few.

Vias serve to provide the catalytic interface. One simple wafer layer is given by the equation of a disc at $A=2\pi r^2$ for the available catalytic layer. When that plate is drilled with a multitude of self-priming vias, the catalytic layer is multiplied by the total number of vias on that surface. A million small vias can increase the surface area by several orders of magnitude, $A=n(2\pi r^2 + h(2\pi r))$, where n is total number of vias. Increasing h greatly improves the surface area, strengthens the capillary effect, and provides more catalytic interface as a result.

In the present invention, vias should have, at a minimum, an adhesion, and seed metal coating. For electrical and catalytic activity, titanium/chrome are suitable materials as the adhesion metal and copper as the seed layer. Typically, these seed layers are co-deposited in a tool similar to a CVD, PVD, ALD, e-beam or sputter type system. Ultra-high aspect ratio vias require a system that can uniformly coat the submicron, high aspect ratio, such as ALD. The vias eliminate the need for pumps, further improving system efficiency. When the solution splits to constituents, the result is a negative pressure that mimics transpiration, thereby increasing the pumping effects. Adding a MEMS system devices suggest generation of electro-mechanical energy. A fabricated via in glass can be used as a precisely controlled filter as well. By controlling via geometry and placement, a filter can be fabricated for use in medical and industrial applications. Glass being chemically, biologically, and electrically inert makes glass an excellent choice in these applications. Vias can also be fabricated laterally in the glass to create a more life-like leaf.

Pillars typically provide the electrical contact between soldered semiconductor devices. These same copper standoffs, with a tin-based cap for the joining of the two interfaces, provides a raised catalytic surface. With a round pillar, that same equation for a cylinder applies with "n" as the number of active surfaces. It is possible to make pillars as tall as 200 um with a diameter in the range of 10-20 um and as close as 50 um. Such a high density can result in at least 2 order of magnitude increase in surface area. The improvement in this embodiment is to increase the density and generate higher aspect ratio pillars. Taller and narrower pillars are desired to increase the "nano catalytic" surface area activity in $CO_2$ applications.

To support $CO_2$ applications, the Cu and Sn pillars are converted to $Cu_xO_y$ and $SnO_x$. For $CO_2$ applications, its desirable to have $Cu_2O$, red copper oxide, instead of the higher temperature black copper oxide. As needed, metal routing is added to support electrical requirements at the active $Cu_xO/CO_2$ interface.

Additionally, a Pd lid may be utilized in the present invention. As a natural $H_2$ filter, a palladium capped via provides an added benefit of generating purified $H_2$ gas that can be used as a precursor material, fuel, or hydrogen for batteries.

The present invention demonstrates that a glass interposer with vas and/or pillars may be used as an improved manmade leaf. Combined with the ability to convert $CO_2$ to CO, sequester $H_2$ and perform with minimal outside energy, the present invention provides broad applications from medicine to space. For example, in the medical field, the present invention can be applied to controlled geometry neural e-contact, drug delivery, biological filtration, capillary electrophoresis and inert housing for bio implants. High aspect TGV mimic the capillary effect that plants use for water transport. A thick substrate with capillaries can facilitate a sustainable, low power, transport system. In the industrial field, small diameter vias support strong capillary effects mimicking nano scale reactants. Better spray nozzles with controlled geometries may be obtained. As for renewable energy, increased catalytic surface area up to 1200% coupled with fabricated MEMS structures to convert $CO_2$ to CO as well as filtration of algae systems for biofuels are distinct advantages of the present invention.

Glass interposers enable the creation for a manmade leaf. Vias and pillars can drastically increase the surface area with little to no outsider power requirements. This glass interposer construct, with high density vias and pillars serves to satisfy the needs for reductions in global $CO_2$ level while generating renewable fuels and lowering the pH of oceans.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications, and embodiments within the scope of the present invention.

What is claimed is:

1. A catalytic system for $CO_2$ capture and sequestration, the system comprising:
   a reduction cell for separating a carrier medium, the reduction cell having an anode generating oxygen, a cathode generating hydrogen and a CO precursor from $CO_2$ in the carrier medium;
   a power supply for providing electrical power to the anode and the cathode, wherein an electrolysis process occurs whereby oxygen, hydrogen and CO precursors are produced;
   wherein the anode and the cathode include a plurality of geometrical constructs to increase an active surface area of a catalytic surface of the anode and cathode to increase an efficiency of the electrolysis process;
   wherein the cathode is a Through Glass Via (TGV) wafer;
   wherein each geometrical construct of the plurality of geometrical constructs are separate, controlled constructs providing controlled capillary.

2. The catalytic system according to claim 1 wherein the plurality of geometrical constructs increases the surface area of the catalytic surface for improving an efficiency of generating hydrogen and the CO precursor.

3. The catalytic system according to claim 1 further comprising a membrane constructed of palladium for filtering the hydrogen.

4. The catalytic system according to claim 1 wherein:
   the catalytic surface includes a plurality of catalytic layers, structures, and constructs;
   the plurality of geometrical constructs includes a plurality of vias; and
   the plurality of catalytic layers provides useful products through the plurality of constructs.

5. The catalytic system according to claim 1 further comprising a substrate having a metal routing to provide an electrical pathway for the catalytic system.

6. The catalytic system according to claim 5 wherein the metal routing utilizes dielectrics to protect the metal routing.

7. The catalytic system according to claim 1 wherein:

the plurality of geometric constructs includes a plurality of vias to increase the surface area of the catalytic surface;

wherein the plurality of vias provides a capillary action for $CO_2$ sequestration across the catalytic surface.

8. The catalytic system according to claim 7 wherein the plurality of vias is coated with atomic layer disposition, chemical vapor disposition, or physical vapor disposition.

9. The catalytic system according to claim 7 wherein the vias are coated with a catalyst.

10. The catalytic system according to claim 9 wherein the catalyst comprises a metal, alloy, or oxide.

11. The catalytic system according to claim 1 further comprising a substrate.

12. The catalytic system according to claim 11 wherein the substrate includes a layer supplying electrical energy via solar energy.

13. The catalytic system according to claim 11 wherein the substrate includes a layer supplying electrical energy via thermoelectric energy.

14. The catalytic system according to claim 13 wherein the energy is supplied wirelessly.

15. The catalytic system according to claim 11 wherein the substrate includes a layer for generating or filtering hydrogen.

16. The catalytic system according to claim 1 wherein the catalytic system is utilized for electrophoresis.

17. The catalytic system according to claim 1 wherein the catalytic system is utilized for blood filtering.

18. The catalytic system according to claim 1 wherein the catalytic system is utilized for filtering algae in biofuel generation.

19. The catalytic system according to claim 1 wherein:
the plurality of geometric constructs includes a plurality of vias;
the plurality of vias providing a capillary effect for transpiration and use as an mechanical pump.

20. The catalytic system according to claim 1 wherein the plurality of geometric constructs includes a plurality of pillars to increase the surface area of the catalytic surface.

21. The catalytic system according to claim 19 wherein the plurality of pillars is hexagonally shaped.

22. The catalytic system according to claim 1 wherein the plurality of geometrical constructs is located on an interposer.

23. The catalytic system according to claim 7 wherein:
the plurality of geometric constructs includes a plurality of pillars to increase the surface area of the catalytic surface;
the plurality of pillars is coated with atomic layer disposition, chemical vapor disposition, or physical vapor disposition.

* * * * *